United States Patent Office 2,911,298
Patented Nov. 3, 1959

2,911,298

COPPER BASE BRAZING ALLOY

Thomas L. Woolard, Wellsville, N.Y., assignor to The Air Preheater Corporation, New York, N.Y., a corporation of New York No Drawing. Application February 11, 1958
Serial No. 714,488

2 Claims. (Cl. 75—159)

This invention relates to brazing alloys, and more specifically it relates to a copper base alloy especially adapted for use as a brazing medium in the brazing of metals, particularly steels and their various alloys.

The most common of such brazing mediums having a reasonably high melting temperature is copper which may be used at temperatures ranging upward to 900 deg. F. Since copper is easily worked and provides nominal strength in the lower temperature ranges, its use for brazing has become an accepted method of fabrication. However, copper itself does not have complete resistance to corrosion and its ultimate strength and resistance to creep is relatively low especially when used at or near its higher temperature limits.

The primary object of this invention is therefore to provide a brazing alloy of the character described having exceptional strength and resistance to creep at temperatures ranging upward to 1500 deg. F.

Another object of this invention is to provide a brazing alloy of the character described having high strength and resistance to creep combined with a low brazing temperature.

Other objects and advantages of the invention will become apparent in the course of the following description.

The alloy of this invention is a ternary alloy in which the primary constituent copper is alloyed with nickel and phosphorus.

The percentage range of alloying elements which I have found to be particularly suitable in connection with my brazing alloy are the following:

| | Percent |
|---|---|
| Copper | 70–90 |
| Nickel | 9–27 |
| Phosphorus | 1–3 |

The percentage of constituent elements may be varied in accordance with the specific use and temperature at which the alloy will be used. For example, a brazing alloy required for temperatures at 900 deg. F. to 1000 deg. F. would include:

| | Percent |
|---|---|
| Copper | 90 |
| Nickel | 9 |
| Phosphorus | 1 |

For use at the upper limits approaching 1500 deg. F. the nickel and phosphorus would be increased at the expense of the copper to provide a high strength alloy, a preferred composition comprising:

| | Percent |
|---|---|
| Copper | 80 |
| Nickel | 18 |
| Phosphorus | 2 |

It is to be understood that even greater strength and resistance to creep may be provided by increasing still further the percentage of nickel in the alloy.

As the proportion of nickel in the alloy is increased the percentage of phosphorus is also increased within the ranges specified, the phosphorus serving only as a melting point depressant that effectively lowers the melting point of the brazing alloy within limits attainable in standard brazing furnaces.

Were it not for the phosphorus present in this alloy, its melting temperature would range within a zone of 2300 deg. F.–2600 deg. F. depending upon the relative amounts of copper and nickel, and commercial use of the alloy would prove impractical.

However, with the addition of phosphorus the melting point of the alloy is lowered to from 1950 deg. F. to 2100 deg. F. so that the brazing process may be carried out with commercially available equipment.

During the brazing operation substantially all the phosphorus is vaporized and leaves the alloy so that the remaining alloy is essentially a binary alloy of copper and nickel having all the attributes of such an alloy, including greater strength and resistance to creep, and a higher melting point.

It is to be understood that certain other elements may be present in the alloy in trace amounts or as impurities, however the amounts of such elements that are present may be considered negligible for the purposes of this invention. Furthermore, certain other variations in the proportions of the elements present in the alloy may be made without departing from the spirit of the invention or the scope of the appended claims.

What I claim is:

1. The copper base brazing alloy consisting of from about 70% to 90% copper; 9% to 27% nickel, and from 1% to 3% phosphorus.

2. A brazing alloy consisting of 80% copper, 18% nickel and 2% phosphorus to provide an initial melting temperature of the alloy of from 1950 deg. F. to 2100 deg. F.

References Cited in the file of this patent

UNITED STATES PATENTS

| 2,200,742 | Harty | May 14, 1940 |
| 2,269,581 | Crampton et al. | Jan. 13, 1942 |
| 2,762,893 | Bredzs | Oct. 30, 1956 |